(12) United States Patent
Xu

(10) Patent No.: US 7,561,548 B2
(45) Date of Patent: Jul. 14, 2009

(54) METHOD FOR A MOBILE TERMINAL HAND-OFF BETWEEN A CDMA SYSTEM AND A WLAN

(75) Inventor: Xiuli Xu, Shenzhen (CN)

(73) Assignee: ZTE Corporation, Shenchen (CN)

( * ) Notice: Subject to any disclaimer, the term of this patent is extended or adjusted under 35 U.S.C. 154(b) by 300 days.

(21) Appl. No.: 10/569,983

(22) PCT Filed: Dec. 17, 2003

(86) PCT No.: PCT/CN03/01078

§ 371 (c)(1),
(2), (4) Date: Feb. 28, 2006

(87) PCT Pub. No.: WO2005/027554

PCT Pub. Date: Mar. 24, 2005

(65) Prior Publication Data

US 2006/0291415 A1 Dec. 28, 2006

(30) Foreign Application Priority Data

Sep. 3, 2003 (CN) .............................. 03 1 56356

(51) Int. Cl.
*H04W 4/00* (2009.01)
*H04W 36/00* (2009.01)
*H04B 7/216* (2006.01)

(52) U.S. Cl. .................. 370/331; 370/332; 370/335; 455/436; 455/437

(58) Field of Classification Search ......... 370/328–335, 370/338, 341–342, 348–350, 352–356, 437, 370/441, 445, 453, 457, 461–463, 902, 908–913; 455/432.1–432.23, 435.1–435.3, 436–451, 455/452.1–452.2, 422.1, 41.2, 453, 461, 455/466, 517, 551, 550.1, 556.1–556.2, 560–561, 455/524–525, 552.1

See application file for complete search history.

(56) References Cited

U.S. PATENT DOCUMENTS 6,477,373 B1 * 11/2002 Rappaport et al. .......... 455/436
7,010,300 B1 * 3/2006 Jones et al. ................. 455/439

(Continued)

FOREIGN PATENT DOCUMENTS

| WO | WO 02/41587 | 5/2002 |
| WO | WO 02/062094 | 8/2002 |
| WO | WO 03/054721 | 7/2003 |

OTHER PUBLICATIONS

International Search Report (PCT/ISA/210) Jun. 17, 2004.

*Primary Examiner*—Meless N Zewdu
(74) *Attorney, Agent, or Firm*—Harness, Dickey & Pierce, P.L.C.

(57) ABSTRACT

A method for handing over a mobile station from wireless local area network to CDMA 20001X system, comprises the following steps of: when a mobile station detects that a signal of wireless local area network is fading, determining to hand over to CDMA 20001X system; first, initiating a call in CDMA 2000 1X system; after a base station permits the terminal to access, establishing, by a packet control function node, a R-P connection with a packet data service node; establishing data transmission channel to CDMA 20001X system for the terminal by the packet data service node; performing data transmission between the terminal and the packet data service node via the packet control function node, and disconnecting, by the packet data service node, the R-P connection established between the packet data service node and wireless access point gateway in the wireless local area network system. The present invention uses the method of first establishing a new link and then disconnecting original link, in which the packet data service node does not change. The method realizes that the terminal can perform seamless handoff between CDMA 20001X system and wireless local area network, and can maintain data transmission uninterrupted.

9 Claims, 3 Drawing Sheets

U.S. PATENT DOCUMENTS

| | | | |
|---|---|---|---|
| 7,035,636 B1 * | 4/2006 | Lim et al. | 455/433 |
| 7,133,386 B2 * | 11/2006 | Holur et al. | 370/331 |
| 7,194,010 B2 * | 3/2007 | Beasley et al. | 370/503 |
| 7,254,119 B2 * | 8/2007 | Jiang et al. | 370/328 |
| 2003/0211843 A1 * | 11/2003 | Song et al. | 455/411 |
| 2004/0082330 A1 * | 4/2004 | Marin | 455/438 |
| 2004/0120277 A1 * | 6/2004 | Holur et al. | 370/328 |
| 2004/0203788 A1 * | 10/2004 | Fors et al. | 455/439 |

* cited by examiner

METHOD FOR A MOBILE TERMINAL HAND-OFF BETWEEN A CDMA SYSTEM AND A WLAN

TECHNICAL FIELD

The present invention relates to a method for handing over a mobile station between two wireless systems, particularly, relates to a method for handing over a mobile station between CDMA20001X system and wireless local area network (wireless LAN, referred as WLAN).

TECHNICAL BACKGROUND

CDMA (Code Division Multiple Access, referred as CDMA) technique is a common multiple modulation technique based on wideband spread spectrum technology. CDMA 2000 1X system conforms to IS-2000 standard, which is in the first phase for the development of CDMA 2000 celluar mobile communication, and can provide transmission rate of 153.6 Kbps for packet data.

FIG. 1 is the network schematic view for the combination of CDMA 2000 1X system and wireless local area network, in which outside the block with dashed lines are function nodes of current CDMA 2000 1X system, and inside the block with dashed lines are function nodes added after a combination of CDMA 2000 1X system and wireless local area network. In the current CDMA 2000 1X system, base station transceivers 11 establish radio coverage area in an area to perform communication of mobile stations; base station controller 12 can control each base station transceiver; a packet control function node PCF generally is comprised in the base station controller 12, which is used for forwarding message between wireless subsystem and packet data service node PDSN 14; the packet control function node PCF connects to base station controller 12 via A8/A9 interface. Packet data service node PDSN 14 is an interface for CDMA 2000 1X system to access Internet, and an interface between packet data service node PDSN 14 and packet control function node PCF 12 is a standard R-P (Radio-Packet) interface, that is A10/A11 interface, in which A10 is data channel, and A11 is control channel. Packet data service node PDSN 14 provides access service for users of CDMA 2000 1X, and users perform authentication and accounting to the Visited Authentication Authorization Accounting server 19, Broker Authentication Authorization Accounting server 17 and Home Authentication Authorization Accounting server 18 via PDSN 14.

When a user requests packet data service, firstly, it goes through mobile switching center 13 to home location register HLR 20 where its validity is authenticated; after the validity is authenticated successfully, A8/A9 interface is established between base station controller BSC 12 and PCF 12, thereafter, PCF 12 transmits message to PDSN 14, and R-P interface is established between PCF 12 and PDSN 14. Then, PPP connection is established between mobile station and PDSN 14. After PPP connection is established successfully, if the user is a simple IP user, data service can start. If the user is a mobile IP user, MIP registration needs further perform, and, after MIP registration is completed successfully, the data service for mobile IP starts. When the user accesses, it needs to perform a full PPP negotiation flow with PDSN 14, in which PPP uses frame-making form of asynchronous HDLC.

Wireless local area network is the result of the combination for computer network and wireless communication technology, which supports communication between computers by using radio multiple access channel, and can provide the data transmission rate of up to 54 Mbps. Terminals of wireless local area network generally dial by using point to point protocol over Ethernet (referred as PPPoE) or web+DHCP (Dynamic Host Configuration Protocol).

Compared to wire network, wireless local area network WLAN has advantages of convenient installation, flexible usage, economy, and easy update, and, therefore, WLAN is used rapidly in the situation where internetworking in mobile and roaming between networks are needed, especially adapts to the situation where line distribution is not easy or data process is performed remotely; particularly in some fields, such as exhibition, meeting, tour service, financial service and mobile office system, WLAN has very great chance for development. The character of wireless local area network is low price, flexible networking, convenient installation, and supporting wireless data access with high speed, which adapts to the application in hot pots such as airport, hotel, etc.

In wireless local area network, wireless terminal accesses fixed telecommunication network via access point AP; AP provides user with the function of wireless access, provides access services of voice and data, and finishes the transfer of 802.11 and 802.3 protocol, in which the data package after converted by AP is Ethernet data package. But wireless local area network has limitation in authentication and accounting mechanism for terminal access, it can only provide authentication on physical transfer layer, but not provide accounting mechanism corresponding to terminal user, therefore, it can not meet the need for applying on telecommunication level, and, moreover, the coverage area of wireless local area network only limits to hot pot areas, which results in very big limitation to the broad application of wireless local area network.

After about 20 years development of CDMA system, CDMA 2000 1X system has recently also been used commercially in big scale. Not only its authentication and accounting mechanism is developed maturely and well, but also its coverage area is universally. But due to the wideband limitation, the capability of CDMA 2000 1X system to provide terminal user with high-speed access service is still limited now. Therefore, if CDMA 2000 1X system and Wireless local area network system are combined to an organic whole, they can exert their respective advantages fully, while the critical problem to combine two systems is how to realize seamless handoff between two systems for terminal users. At present, no technical document has been seen about handoff between two systems for terminal users.

SUMMARY OF INVENTION

The technical problem solved by present invention is to provide a method for handing over a mobile station between code division multiple access system and wireless local area network, to realize seamless handoff between two systems for mobile stations.

In order to solve the above technical problem, the present invention provides a method for handing over a mobile station from wireless local area network system to the CDMA 2000 1X system, which comprises the following steps of:

Step 1, when a mobile station detects that a signal of wireless local area network is fading or has disappeared, determining whether to hand over the mobile station from wireless local area network to the CDMA 2000 1X system, if yes, performing step 2; if not, continuously using service provided by original wireless local area network system or disconnecting the connection;

Step 2, initiating call in the mobile station in CDMA 2000 1X system, after a base station permits the mobile station to access, establishing R-P connection with a packet data service node by a packet control function node;

Step 3, after the packet data service node determines the mobile station is a handoff user, establishing a data transmission channel in CDMA 2000 1X for the mobile station;

Step 4, performing data transmission between the mobile station and the packet data service node via the packet control function node, and disconnecting, by the packet data service node, the R-P connection established between the packet data service node and wireless access point gateway in wireless local area network system.

During handoff, if data transmission is needed between the packet data service node and the mobile station, the data is forwarded via wireless access point gateway.

In the above step 3, the packet data service node directly uses the PPP connection information of original link, and do not negotiate point to point link again during handoff.

In order to solve the above technical problem, the present invention further provides a method for handing over a mobile station from CDMA 2000 1X system to a wireless local area network, which comprises the following steps of:

Step 1, after detecting a signal of a wireless local area network in a mobile station, connecting to an access point in the wireless local area network, and determining whether to hand over the mobile station from CDMA 2000 1X system to the wireless local area network system, if yes, performing step 2; otherwise, continuously using service provided by original CDMA 2000 1X;

Step 2, performing dial connection to the wireless local area network system in the mobile station, and establishing connection with wireless access point gateway;

Step 3, after the wireless access point gateway permitting the mobile station to access, establishing a R-P connection between the wireless access point gateway and a packet data service node;

Step 4, after the packet data service node determines the mobile station is a handoff user, establishing a data transmission channel to the wireless local area network for the mobile station;

Step 5, performing data transmission between the mobile station and the packet data service node via the wireless access point gateway, and disconnecting, by the packet data service node, the R-P connection established between the packet data service node and a packet control function node in CDMA2000 1X system.

During said handoff, if data transmission is needed between the packet data service node and the mobile station, data is forwarded via packet control function node.

In the above step 2, the mobile station dials in PPPoE form.

In the above step 3, after the wireless access point gateway permits the mobile station to access, it sends A11 registration request message to the packet data service node; if the packet data service node receives the registration request message, it will returns A11 registration answer message to the wireless access point gateway; after the wireless access point gateway receives the answer message, R-P connection is established successfully.

In the above step 4, the packet data service node directly uses PPP connection information of original link.

From the above, during handoff, the handoff method of the present invention firstly establishes a new link, and thereafter disconnects original link; and in the process of handoff, the method maintains the original packet data service node unchanged and without re-negotiation between the packet data service node and the mobile station for point to point link, which can make the mobile station maintain data transmission uninterrupted during handoff between CDMA 20001X system and wireless local area network system, and can make the least signaling exchanged in the process of handoff. The method provides data service for users by fully utilizing wide coverage, the character of CDMA 20001X system, and high speed data transmission, the character of wireless local area network, moreover, realizing seamless handoff of terminal users between CDMA 20001X system and wireless local area network system, and realizing organic combination of CDMA 20001X system and wireless local area network system.

DETAILED DESCRIPTION OF PREFERRED EMBODIMENTS

Next, the technical scheme of the present invention will be described in details in conjunction with the drawings and embodiments.

Figure 1:
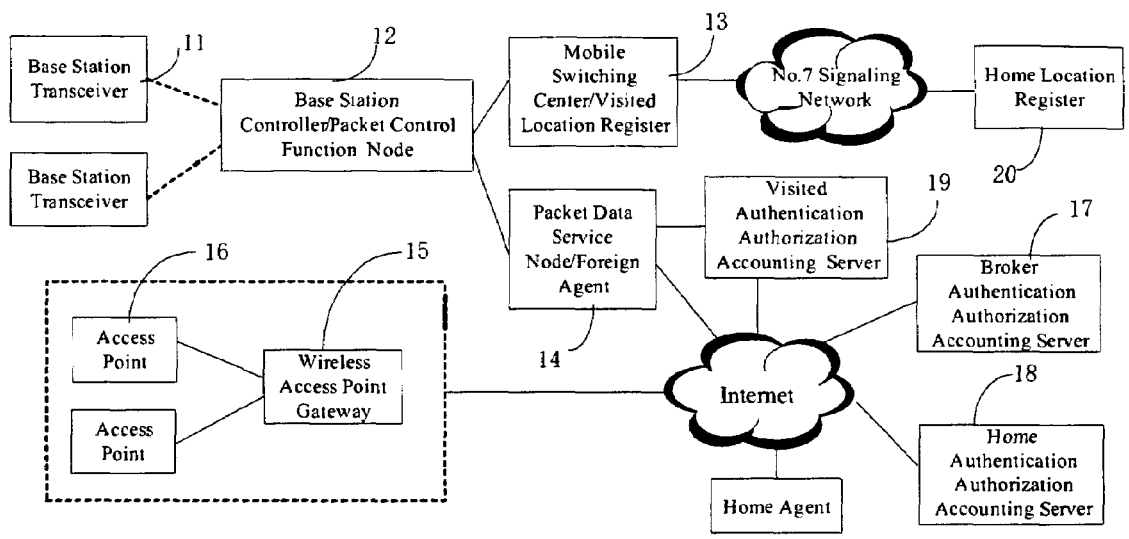
FIG. 1 is the network configuration view for combination of CDMA 20001X system and wireless local area network system.

The handoff method of the present invention adapts to a combination network of CDMA20001X system and a wireless local area network system shown in FIG. 1. In FIG. 1, outside the block with dashed lines are function nodes of CDMA 20001X system, and inside the block with dashed lines are function nodes added after CDMA 20001X system combined with a wireless local area network. In the Technical Background, the main function nodes of CDMA 20001X system were explained; next, the main function nodes related to the present invention will be explained.

Packet control function node PCF 12 mainly realizes connection of air wireless interface and packet data service node PDSN 14.

Packet data service node PDSN 14 is used to realize the access for terminal of CDMA 20001X system and wireless local area network system, and provides two kinds of access forms for terminal of CDMA 20001X system and wireless local area network system: simple IP service and mobile IP service, and meanwhile maintains PPP connection information for the terminal; further, when a mobile station is handed over between the wireless local area network system and CDMA 20001X system, packet data service node PDSN 14 is further used to identify whether the current user is a handoff user, that is, it judges whether the mobile station requesting handoff has the ability to access CDMA 20001X system and the wireless local area network system, if the current mobile station is a handoff user, PDSN 14 opens the corresponding data transmission channel for the current mobile station.

Access point (referred as AP) 16 is used to convert signal of the wireless local area network into signal to be transmitted via a wire network, and accomplishes simple management for a wireless user and dynamic allocation of wireless channel.

Access point gateway (referred as APGW) 15 is mainly used to realize three layer encapsulation for data of wireless local area network terminal (i.e, encapsulating the Ethernet data package after AP conversion into IP package) and de-encapsulation, and to transmit data of wireless local area network terminal to packet data service node PDSN 14, or to forward data transmitted from packed data service node PDSN 14 to wireless local area network terminal.

The interface between packet control function node 12 and packet data service node 14 and the interface between wireless access point gateway 15 and packet data service node 14 are all standard R-P interfaces.

The terminal of wireless local area network uses PPPoE dial form to access packet data service node 14, PPPoE dial access has negotiation in two phrases: finding phrase and session phrase, in which the finding phrase is for finding the node wireless access point gateway 15 that provides service, and the session phrase is for realizing the negotiation for point to point link between terminal and packet data service node 14.

As for a mobile station, in order to realize seamless handoff between CDMA 20001X system and wireless local area network system, it needs two independent air interfaces, which can connect to CDMA 20001X system and can also connect to wireless local area network, and it has function of independent handoff between two systems, for example, when mobile station detects that signal of wireless local area network fades to a certain extent, or when it has detected no signal of wireless local area network, it performs access call to CDMA 20001X system; or after mobile station reaches coverage area of wireless local area network, it automatically connects to the wireless local area network. And at the same time, mobile user should have ability to access two systems.

Because the coverage of current wireless local area network system only limits to hot pots, when a mobile station is far away from the access point, error frame rate of data transmission will increase, and the transmission rate will obviously decrease. At this time, the mobile station needs to hand over automatically from wireless local area network to CDMA 20001X system.

Furthermore, after a mobile station accesses the system via a wireless local area network, it needs detect signal magnitude of wireless local area network. If the signal of wireless local area network is weaker, or the signal of wireless local area network can not be detected any more, the mobile station determines to hand over from wireless local area network system to CDMA 20001X system according to a certain rule, such as a pre-determined threshold of the signal magnitude, or the pre-determined rule for handoff.

From the description above, it can be know that the connection form between PCF 12 and PDSN 14 in CDMA 20001X system and the connection form between APGW 15 and PDSN 14 in WLAN system have function and networking in common. PCF 12 and APGW 15 are all conversion interfaces between wireless and wire, the difference is only in the protocol of wireless side process: when establishing PPP connection, PPP negotiation flow needs to be accomplished, the protocol used in wireless local area network system is PPPoE protocol, while the protocol used in CDMA 20001X system is PPP protocol encapsulated by asynchronous HDLC; in the second phrase of PPPoE—PPP session phrase, the protocol used is same as the PPP protocol encapsulated by asynchronous HDLC. Furthermore, user information of them is also same in essence. Therefore, on the basis of original function of PDSN 14, adding access of wireless local area network users can support the access of PCF 12 and APGW 15 at the same time. And at the same time, the PPP connection information of a user is stored in PDSN 14, which also provides possibility for seamlessly handing over a mobile station between WLAN system and CDMA 20001X system.

Figure 2:
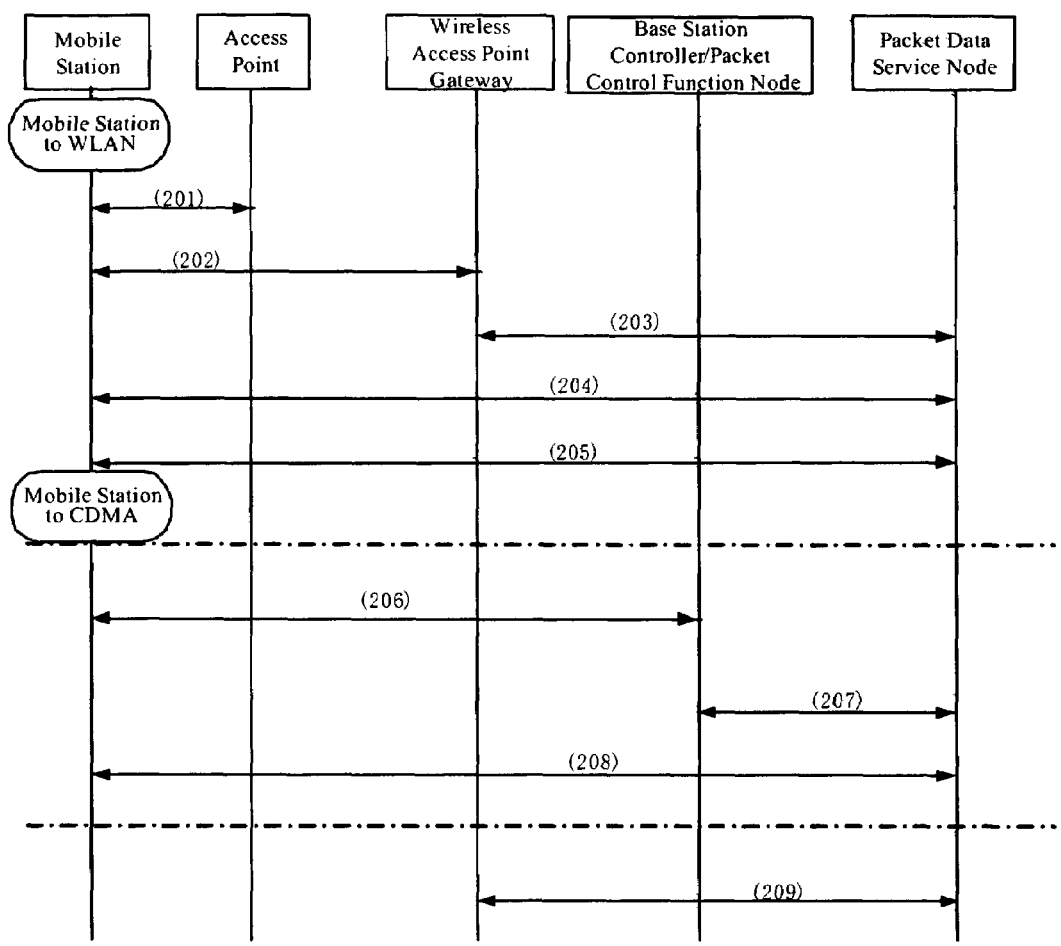
FIG. 2 is the flow chart view for handing over a mobile station from wireless local area network system to CDMA 20001X system according to the present invention.

FIG. 2 is an embodiment for accessing mobile station to wireless local area network system and handing over from wireless local area network system to CDMA 20001X system, during handoff, packet data service node does not change.

The step for accessing mobile station to wireless local area network system is described in the following. a connection is established between a mobile station and a wireless access point AP (step 201); after an air channel of wireless local area network is established, the mobile station dials by using PPPoE form, and negotiation in PPPoE finding phrase with a wireless access point gateway APGW is performed (step 202). After the wireless access point gateway permits the mobile station to access, A11 registration request message is transmitted to a packet data service node, if the packet data service node receives the registration request message, it returns A11 registration answer message to the wireless access point gateway, after the wireless access point gateway receives the answer message, a R-P connection between the wireless access point gateway and the packed data service node is established successfully (step 203). After the R-P connection between the wireless access point gateway and the packet data service node is established successfully, between the mobile station and the packet data service node negotiation for point to point PPP link is performed. During establishment of a PPP connection, if the mobile station is a simple IP user, the packet data service node allocates a IP address to the mobile station; if the mobile station is a mobile IP user, it needs perform further MIP registration (step 204). After the PPP link between the mobile station and the packet data service node is established successfully (for a mobile IP user, its registration of MIP is also successful), the packet data service node starts to provide data transmission service for the mobile station (step 205).

Mobile station detects signals of the wireless local area network continuously, when a signal of wireless local area network fades to a pre-determined handoff threshold, the mobile station performs the following steps for handing over from the wireless local area network system to CDMA 20001X system. The mobile station performs access call to CDMA 20001X system (step 206); after a base station permits the mobile station to access, between a packet control function node and the packet data service node a R-P connection is established (step 207). After the R-P connection between the packet control function node and the packet data service node is established successfully, the packet data service node determines the user is a handoff user, that has established a link connection with the packet data service node, then data transmission is performed between the mobile station and the packet data service node via the packet control function node (step 208), and finally the packet data service node releases the R-P connection between the wireless access point gateway and the packet data service node (step 209).

From the above steps, a process for accessing a mobile station to a wireless local area network, and then handing over to the CDMA 20001X system is accomplished. During the process of handoff, a method of first establishing a new link and then disconnecting original link is used. The packet data service node does not change during the handoff and re-negotiation of point to point PPP is not performed. Therefore, uninterrupted transmission of user data is ensured, and seamless connection is realized.

Also, after a mobile station accesses CDMA 20001X system, signals of wireless local area network are continuously detected. If a signal of a wireless local area network is detected, then the mobile station can hand over from CDMA 2000 1X system to the wireless local area network system according to a certain rule, such as a pre-determined threshold of signal magnitude, or a pre-determined rule for handoff.

Figure 3:
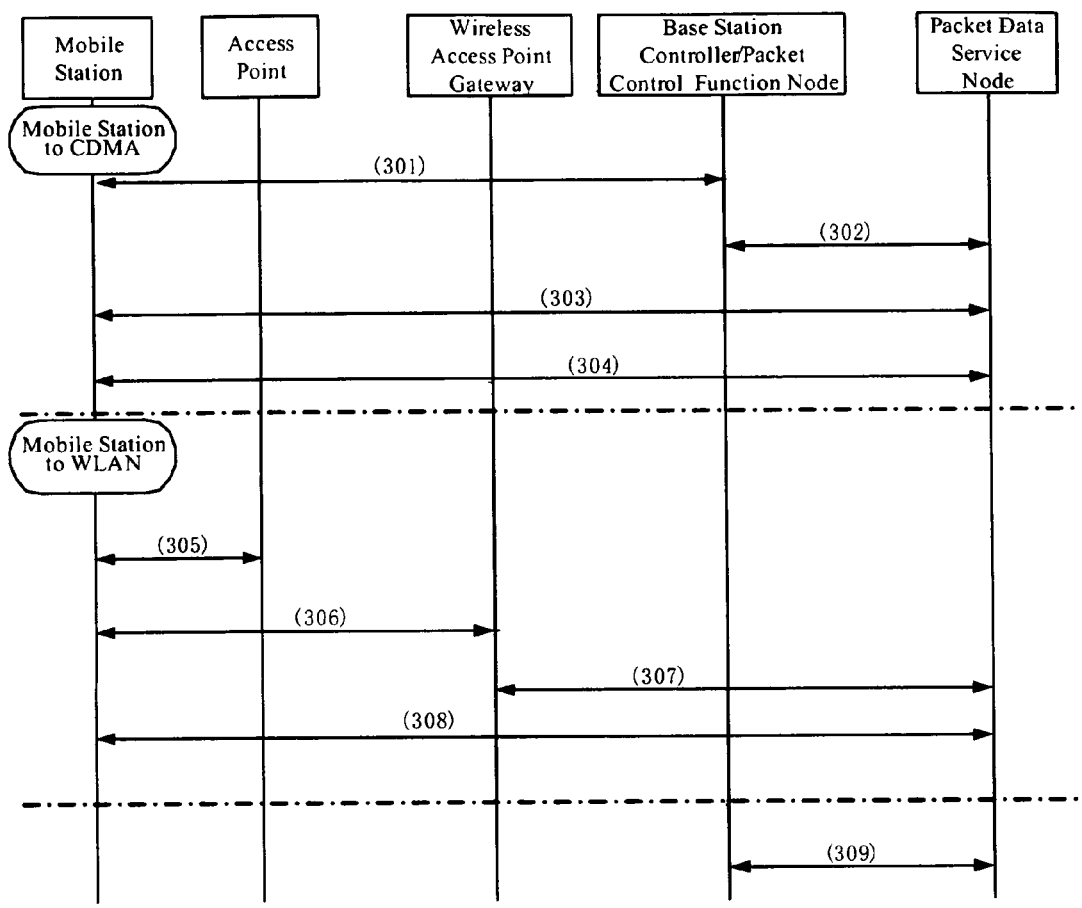
FIG. 3 is the flow chart view for handing over a mobile station from CDMA 20001X system to wireless local area network system according to the present invention.

FIG. 3 is a handoff embodiment for accessing a mobile station to CDMA 20001X system and handing over from CDMA 20001X system to wireless local area network system, in which the packet data service node does not change during handoff.

The steps for accessing mobile station to CDMA 2000 1X system are described as the following. The mobile station performs dial call to CDMA 20001X system (step 301), and a R-P connection between a packet control function node and a packet data service node is established (step 302). Then negotiation for point to point PPP link between the mobile station and the packet data service node is performed (step 303); when the PPP link between the mobile station and the packet data service node is established successfully, the packet data service node provides data transmission service for the mobile station (step 304).

After the mobile station detects a signal of a wireless local area network, a connection is established between the mobile station and a wireless access point (step 305). The mobile station decides whether it needs handoff according to a certain rule. When the mobile station determines to hand over from CDMA 20001X system to the wireless local area network system, it performs PPPoE dial, and perform negotiation for PPPoE finding phrase with a wireless access point gateway (step 306). After the wireless access point gateway permits the mobile station to access, it transmits A11 registration request message to the packet data service node; if the packet data service node receives the registration request message, it returns A11 registration answer message to the wireless access point gateway; after the wireless access point gateway receives the answer message, R-P connection is established successfully (step 307). Thereafter, the packet data service node determines the mobile station is a handoff user, and data transmission is performed between the mobile station and the packet data service node via the wireless access point gateway (step 308), and at the same time, the packet data service node releases the R-P connection between the packet control function node and the packet data service node (step 309).

From the above steps, the process for accessing a mobile station to CDMA 20001X system and handing over to wireless local area network system is completed.

During handoff, the method of first establishing a new link and then disconnecting original link is also used; and during handoff, re-negotiation for point to point PPP is not performed, and transmission of user data is not interrupted.

In a WLAN system and CDMA 20001X system, identification of a user is unique, so the user can use its NAI (Network Access Identifier) or MSID (Mobile Station Identifier) in CDMA 20001X system for authentication and accounting under a WLAN mode.

In a conclusion, the method provided by the present invention for handing over a mobile station between CDMA 20001X system and wireless local area network system realizes seamless handoff between two systems by using standard R-P interface and handoff function of packet data service node via wireless access point gateway APGW, and therefore organic combination of CDMA 20001X system and wireless local area network system is realized. The handoff method of the present invention also adapts to a handoff between CDMA 20001X EV-DO, CDMA 20001X EV-DV and a wireless local area network system.

Lastly, it should be noted that the above embodiments are only for illustrating technical scheme of the present invention, without any limitation. Although the present invention is described in details reference to the preferred embodiments, the ordinary person skilled in the art should understand that the technical solution of the present invention can be modified or Substituted, without departing from the spirit and scope of the technical solution of the present invention, all of which should be covered in the scope of the following claims.

What is claimed is:

1. A method for handing over a mobile station from a wireless local area network system to a CDMA 2000 system, comprising:
   step 1: when the mobile station detects that a signal of the wireless local area network is fading or has disappeared, determining to hand over the mobile station from the wireless local area network to the CDMA 2000 system, the mobile performs step 2;
   step 2: initiating a call in the mobile station in the CDMA 2000 system, after a base station permits the mobile station to access, establishing R-P connection with a packet data service node by a packet control function node;
   step 3: after the packet data service node determines the mobile station is a handoff user, establishing a data transmission channel in the CDMA 2000 for the mobile station; and
   step 4: performing data transmission between the mobile station and the packet data service node via the packet control function node, and disconnecting, by the packet data service node, the R-P connection established between the packet data service node and a wireless access point gateway in wireless local area network system.

2. The method for handing over the mobile station from a wireless local area network system to the CDMA 2000 system according to claim 1, wherein during handoff, the data transmission between the mobile station and the packet data service node is forwarded via the wireless access point gateway.

3. The method for handing over the mobile station from a wireless local area network system to the CDMA 2000 system according to claim 1, wherein in the step 3, the packet data service node directly uses PPP link information of original link without re-negotiation for point to point link.

4. A method for handing over a mobile station from a CDMA 2000 system to a wireless local area network, comprising:
   step 1: after, the mobile station detecting a signal of the wireless local area network, connecting to an access point in the wireless local area network, and determining to hand over the mobile station from the CDMA 2000 system to the wireless local area network system, the mobile station performs step 2;
   step 2: performing dial connection to the wireless local area network system in the mobile station, and establishing connection with a wireless access point gateway;
   step 3: after the wireless access point gateway permits the mobile station to access, establishing a R-P connection between the wireless access point gateway and a packet data service node, data transmission is performed between the mobile station and the packet data service node via a packet control function node;
   step 4: after the packet data service node determines the mobile station is a handoff user, establishing a data transmission channel to the wireless local area network for the mobile station; and
   step 5: performing data transmission between the mobile station and the packet data service node via the wireless access point gateway, and disconnecting, by the packet data service node, the R-P connection established between the packet data service node and the packet control function node in the CDMA2000 system.

5. The method for handing over the mobile station from the CDMA 2000 system to a wireless local area network according to claim 4, wherein in the step 2, the mobile station dials by using PPPoE form.

6. The method for handing over the mobile station from the CDMA 2000 system to a wireless local area network according to claim 4, wherein the step 3 further comprises:

after the wireless access point gateway permits the mobile station to access, transmitting A11 registration request message to the packet data service node, if the packet data service node receives the registration request message, returning A11 registration answer message to the wireless access point gateway; whereby after the wireless access point gateway receives the answer message, the R-P connection is established successfully.

7. The method for handing over the mobile station from the CDMA 2000 system to a wireless local area network according to claim 4, wherein in the step 4, the packet data service node directly uses PPP link information of original link.

8. The method for handing over the mobile station from a wireless local area network system to the CDMA 2000 system according to claim 1, wherein in the step 1, when a mobile station detects that a signal of wireless local area network is fading or has disappeared, if the determination is made not to hand over, the mobile station continuously uses service provided by the original wireless local area network system or disconnects the connection.

9. The method for handing over the mobile station from the CDMA 2000 system to a wireless local area network according to claim 4, wherein in the step 1, after detecting a signal of a wireless local area network in a mobile station, connecting to an access point in the wireless local area network, if the determination is made not to hand over, the mobile station continuously uses service provided by the original CDMA 2000.

* * * * *